May 14, 1940.  C. C. WINSLOW  2,200,482
ROCK BIT
Filed Aug. 13, 1938
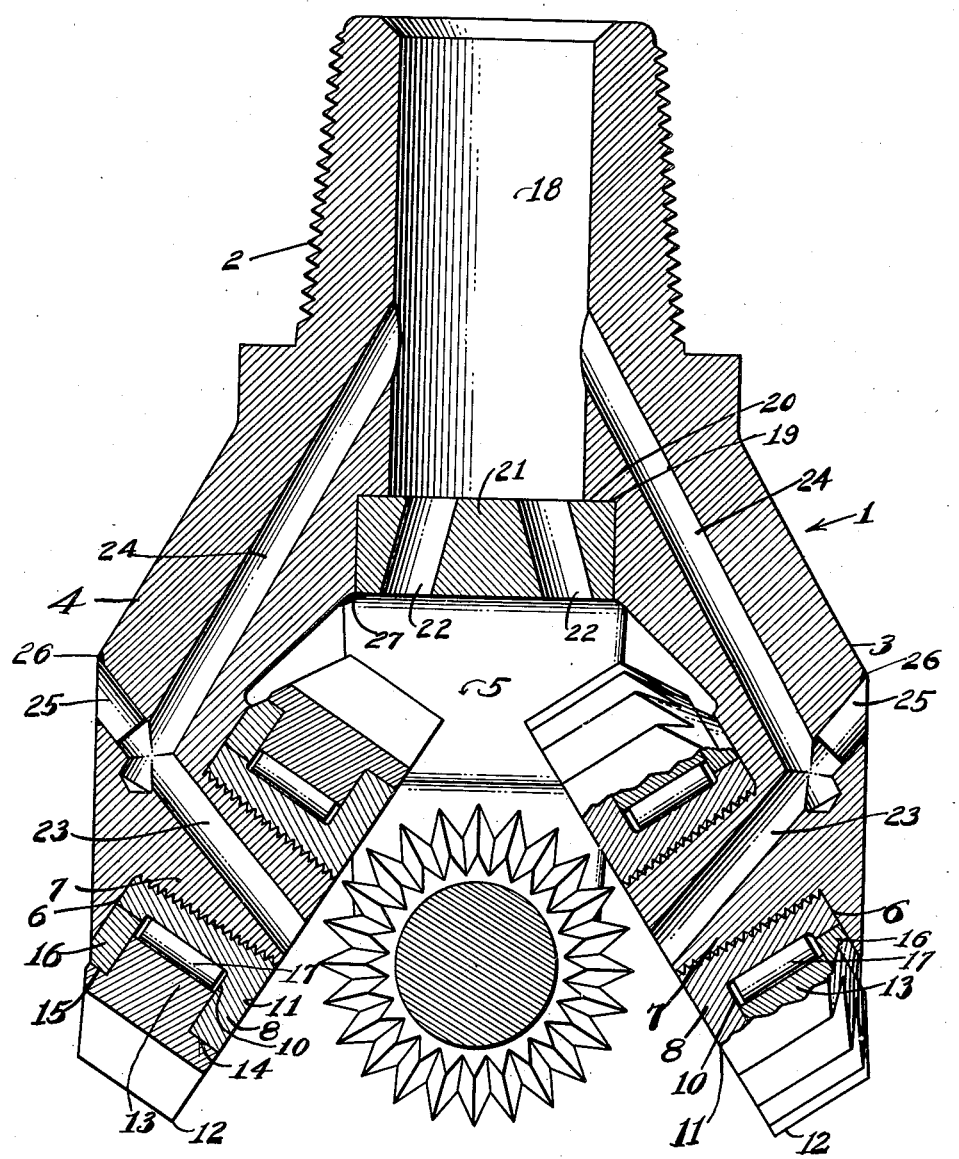
Charles Cecil Winslow,
INVENTOR;
BY Calvin Brown,
ATTORNEY Patented May 14, 1940

2,200,482

UNITED STATES PATENT OFFICE 2,200,482

ROCK BIT

Charles Cecil Winslow, Long Beach, Calif.

Application August 13, 1938, Serial No. 224,747

2 Claims. (Cl. 255—71)

This invention relates to improvements in rock bits, and more particularly has to do with a novel means and method of circulating fluid in advance of the cutters of said bit, to the end that the bottom of the hole is maintained clear of cuttings.

The invention likewise contemplates as an object thereof a novel device whereby circulating fluid is so directed as to at all times maintain the teeth of the cutters clean, to the end that the cutters will perform the functions intended for them in an efficient manner.

Other objects of the invention include a device which is simple of construction, and superior as to results obtained.

With the above mentioned and other objects in view, the invention consists in the novel and useful provision, formation, construction, association, and relative arrangement of parts, members and features, all as shown in a certain embodiment in the accompanying drawing, described generally, and more specifically pointed out in the claims.

In the drawing the figure is a vertical sectional view illustrating the construction of the rock bit.

Referring to the drawing, 1 designates the body as an entirety, the body including a threaded pin 2 which, through the medium of a collar, is secured to the drill stem.

The body 1 is so constructed as to have diametrically disposed leg members, of which two are shown in opposite-parallel relationship at 3 and 4, and a further leg at 5. There would be an identical leg opposite the leg 5. The leg 5 is at right angles to the legs 3 and 4.

The legs 3 and 4 are both formed in a like manner, for which reason the leg 3 will be described. This leg is formed with a face portion 6 which is at a convergent angle to the longitudinal axis of the pin. Extending outwardly from the face 6 is a tapered screw-threaded stud 7. Secured to the threads of the stud is a threaded bushing 8 formed with a race 10. This bushing has a side wall 11. The cutter roller or disc of the present invention is provided with the usual cutter teeth 12, and the said cutter roller or disc is cut so as to provide a portion 13 of lesser cross-sectional width than the width of the cutter, to thereby provide shoulders at 14 and 15. The part 11 of the bushing is closely adjacent the shoulder 14 in such a manner that the face of this portion 11 is in alignment with the inner face of the cutter. A washer, or other thrust member 16, in a like manner is received between the member 13 and the shoulder 15, and is closely adjacent the bushing. The part 13 is spaced from the race 10 of the bushing to permit the interposition of rollers 17. This construction, of course, permits the cutter or disc to be held to the stud 7. A roller core cutter 5' is journaled at its ends in the legs 5.

That portion of the body where the legs would normally intersect were it not for the presence of the through bore 18 of the pin, is provided with an enlarged diameter cut, that is to say, of greater diameter than the bore 18, as indicated at 19. This construction results in the provision of an annular shoulder 20, and adapted to be received within said enlarged diameter portion is a removable plug or disc 21, provided with through bores or ports 22. In the present instance, two bores or ports 22 are shown and these two converge downwardly or it may be said that the axis of these bores is convergent relative to the axis of the bore 18. These bores are adapted to direct fluid passed therethrough upon the cutter teeth 12 of the cutters or discs.

In order to assure that the bottom of the well hole is kept clear or clean of cuttings, I have provided a bore 23 extending through each stud 7. The angularity of this bore relative to the axis of the stud is such that any fluid that might be passed through the said bore and outwardly thereof would be directed under the roller core cutter 5' against the bottom of the hole cut by the cutters in a path which would be centrally disposed between the side cutters whereby the core cutter 5' is washed and the cuttings are flushed out of the hole. I further bore the leg so as to provide bore or port 24, which bore intersects the bore 23, as shown in the drawing, and has communication with the bore 18 above the removable plug 21. A plug 25 is placed within the bore 23, to the end that fluid passed through the bore 24 will be immediately directed into the bore 23 and outwardly between the cutters and against the formation being cut. This plug may be held in any convenient way within the bore, such as by welding, as indicated at 26.

The removable plug 21 may be secured in position by welding, as indicated at 27.

The operation, uses and advantages of the invention are as follows:

When mud is being passed through the drill stem during rotation of the drill stem and consequent rotation of the rock drill, this mud will be received within the bore 18 and diverted through the bores 23 and 24 against the bottom of the well hole, and likewise said mud will be diverted through the bores 22 upon the cutter teeth. Thus, the cutter teeth are maintained clean, and cuttings which would normally form in the bottom of the well hole are washed away so that the cutters at all times act upon fresh formation to be cut.

It is obvious that various changes and modifications and variations may be made in practicing the invention in departure from the particular description as given without, however, departing from the true spirit of the invention as defined by the scope of the appended claims.

I claim:

1. In a rock drill, a body formed with a pair of legs, studs carried by said legs and extending inwardly and downwardly at an inclination, roller cutters rotatably mounted on said studs and inclined outwardly in a downward direction, said body being provided with a central bore, said legs being provided with bores, respectively, leading from said central bore, and said studs being provided respectively with bores leading therethrough from the bores in said legs respectively to outside of said cutters and directed downwardly and inwardly from said roller cutters, for directing fluid from said leg bores and central bore freely and directly against the bottom of the hole cut by said roller cutters, for flushing out the cuttings of said roller cutters, and a plug fitted within said central bore and provided with divergent bores for directing fluid from said central bore upon the teeth of said roller cutters for washing the same.

2. In a rock drill, a body formed with two pairs of legs, studs carried respectively by the legs of one of said pairs, which studs extend inwardly and downwardly at an inclination, a pair of roller cutters rotatably mounted on said studs respectively, a transverse roller core cutter journaled in said other pair of legs and extending between said first pair of cutters, said body being provided with a central bore, said legs being provided with bores, respectively, leading from said central bore, and said studs being provided respectively with bores leading therethrough from the bores in said legs respectively to outside of said pair of roller cutters and directed downwardly and inwardly from said pair of roller cutters, for directing fluid from said leg bores and central bore freely and directly under said transverse roller cutter and against the bottom of the hole cut by said cutters, for washing said transverse roller core cutter and flushing out the cuttings of said roller cutters.

CHARLES CECIL WINSLOW.